(12) United States Patent
Vankayala et al.

(10) Patent No.: US 12,192,784 B2
(45) Date of Patent: Jan. 7, 2025

(54) METHOD AND NETWORK APPARATUS FOR GENERATING REAL-TIME RADIO COVERAGE MAP IN WIRELESS NETWORK

(71) Applicant: SAMSUNG ELECTRONICS CO., LTD., Suwon-si (KR)

(72) Inventors: Satya Kumar Vankayala, Karnataka (IN); Swaraj Kumar, Karnataka (IN); Seungil Yoon, Suwon-si (KR); Samuel Ignatius Kanakaraj, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 332 days.

(21) Appl. No.: 17/878,521

(22) Filed: Aug. 1, 2022

(65) Prior Publication Data

US 2023/0037893 A1 Feb. 9, 2023

(30) Foreign Application Priority Data

Aug. 2, 2021 (IN) .............................. 202141034785
Jul. 26, 2022 (IN) .............................. 202141034785

(51) Int. Cl.
*H04W 4/00* (2018.01)
*G06V 20/13* (2022.01)
*H04W 16/18* (2009.01)

(52) U.S. Cl.
CPC ............ *H04W 16/18* (2013.01); *G06V 20/13* (2022.01)

(58) Field of Classification Search
CPC ............................... H04W 16/18; H04W 28/00
See application file for complete search history.

(56) References Cited

U.S. PATENT DOCUMENTS

| | | | | |
|---|---|---|---|---|
| 2009/0012745 A1* | 1/2009 | Longman | ................. | G01T 7/00 702/179 |
| 2013/0150054 A1* | 6/2013 | Axmon | ............... | H04W 36/322 455/440 |
| 2013/0189991 A1* | 7/2013 | Rose | ................ | H04W 36/0085 455/436 |
| 2019/0281542 A1* | 9/2019 | H?vizi | ................. | H04B 17/318 |
| 2023/0194279 A1* | 6/2023 | Kakosyan | ............... | H04L 67/52 701/411 |
| 2023/0196684 A1* | 6/2023 | Li | ....................... | G06F 3/04815 345/419 |

FOREIGN PATENT DOCUMENTS

| | | |
|---|---|---|
| JP | 2019-122008 | 7/2019 |
| KR | 10-2235645 | 4/2021 |
| KR | 10-2022-0042928 | 4/2022 |
| WO | 2020/234902 | 11/2020 |

* cited by examiner

*Primary Examiner* — Abdelnabi O Musa
(74) *Attorney, Agent, or Firm* — Nixon & Vanderhye, P.C.

(57) ABSTRACT

Embodiments herein provide a method for generating a real-time radio coverage map in a wireless network by a network apparatus. The method includes: receiving real-time geospatial information from one or more geographical sources in the wireless network; determining handover information of at least one user equipment (UE) in the wireless network from a plurality of base stations based on the real-time geospatial information; and generating the real-time radio coverage map based on the handover information of at least one UE and the real-time geospatial information.

20 Claims, 12 Drawing Sheets

METHOD AND NETWORK APPARATUS FOR GENERATING REAL-TIME RADIO COVERAGE MAP IN WIRELESS NETWORK

CROSS-REFERENCE TO RELATED APPLICATIONS

This application is based on and claims priority under 35 U.S.C. § 119 to Indian Provisional Patent Application No. 202141034785, filed on Aug. 2, 2021, in the Indian Patent Office, and to Indian Complete Patent Application No. 202141034785, filed on Jul. 26, 2022, in the Indian Patent Office, the disclosures of which are incorporated by reference herein in their entireties.

BACKGROUND

Field

The disclosure relates to a radio map estimation using a generative adversarial network, and for example, to a method and a network apparatus for generating a real-time radio coverage map in a wireless network.

Description of Related Art

In general, radio maps can provide a precise awareness of a radio environment in a spatial domain by processing a geo-localized spectrum use. Such information can be gathered by measurement capable devices like on-board sensor nodes of vehicles or from access nodes deployed in a smart city context, etc. Updating the radio map frequently is expensive and practically inefficient as measurements are collected from various devices. Therefore, it is cost and resource effective to update the radio map depending on the mobile data traffic and time in a day. The radio maps also find their potential applications in fifth generation (5G) heterogeneous networks, where their availability could be crucial in spectrum sensing in cognitive radios, interference management, coverage analysis, device to device communications, formation control and connectivity maintenance in multi-agent system.

In an example, in order to estimate the radio maps, path loss models are used to calculate the amount of received power from a transmitter and more specifically the drop in the received power, as one move away from the transmitter. The radio waves propagate through buildings and undergo various stages of reflection, this interaction with obstacles leads to the decrease in received power. There are many models available for estimation. More realistic the situation, more complex the model. The simplest approach is the free space path loss model which calculates the received power based on the inverse square law along a single line of sight propagation path. Given below are some of the more complex models.

1. Two Ray Model: This model considers the interaction of two rays, one along the line of sight and the reflected ray from the ground between the transmitter and receiver. It computes interference in far field only
2. Two Ray Interference: This is an improvement of the simple two ray model since it considers interference in the near field as well.
3. Rician Fading: This is a stochastic path loss models that considers the line of sight and multiple reflected signals between the transmitter and receiver. This model can be used to model several obstacles such as buildings in an urban locality.
4. Log Normal Shadowing: Another stochastic model which assumes that power levels follow a log normal distribution.

Further, the radio map estimation is becoming quite crucial in 5G/6G systems. In order to meet the ever growing users demand Operators are installing the base stations exponentially to meet the users' requirement. This results in many coverage holes. In order to obtain the radio-map signal estimation is quite expensive computationally. There is a trade-off between computing resources and 5G/6G system radiomap signal strength details. Further, frequent radio map estimation is expensive as this results in wastage of frequency resources and drains a UE battery wastage. There is a need to leverage Artificial intelligence/Deep Machine learning techniques and 5G/6G Cloud Architecture to estimate the radio pathloss. There is a need for higher Quality of Experience (QoE) due to stringent packet deadline, packet loss tolerance, user experience. This can be achieved with faster and accurate pathloss prediction on per user basis. Based on the pathloss information, there is a need for computing optimal tilt of antenna to improve coverage area information using AI/ML techniques by leveraging cloud architecture. There is a need for finding coverage area holes due to shadowing, reflection, refraction, diffraction and distance. To improve the smooth user experience, there is a need for avoiding coverage area holes.

With inaccurate the pathloss information, overall throughput of the system will come down. Further, over-estimation of pathloss information will leads to large number of packet decoding errors. Resulting in bad user experience. Under-estimation of pathloss information will leads to lower system throughput. Resulting in large number of users getting data starved.

Further, in other existing methods, a Key Performance Indicators (KPIs) that are considered for 2D/3D map of the area including buildings, trees, material of the objects etc. The KPIs are collected using geospatial dataset, which is manually collected. One the environment is visualized the ray tracing method is used to generate radio map/path loss for the environment. Drawback of the ray tracing method is that it requires huge amount of computational resource to generate the radio map/path loss. Because of this the radio map cannot be generated on frequent basis to keep track of the network efficacy. Problems with radio map generations are—Path loss (power falloff relative to distance), Shadowing (random fluctuations due to obstructions), and Flat and frequency selective fading (caused by multipath)

FIG. 1 is a diagram illustrating an example representation (S100) of wave fronts as simple particles (geometry vs. Maxwell's differential equations), according to the prior art. Referring to FIG. 1, the method can incorporate all signal components like reflections, scattering, and diffraction. Reflected rays have power falloff proportional to d2 by free space path loss model. Scattered and refracted rays have power falloff that depends on exact distance of scattering or refractive object from the transmitter and a receiver. If objects are more than a few wavelengths from the receiver, typically neglect scattering and refraction. Most computer packages for channel simulation in indoor/outdoor environments use general ray tracing for path loss. Model requires detailed site information.

Further, in another existing method, a radio map assigns each transmitter-receiver pair which are located in a grid, an attenuation factor G(x,y) where x,y are the coordinates of the receiver. Thus the received power is given by equation (1) below:

$$Y = \sqrt{G(x,y)} HX + Z \qquad (1)$$

In the above equation, X is the transmitted signal power and Y is the received signal sample. H is small scale fading and G(x,y) is the attenuation which is a spatial function. Z is the additive Gaussian noise.

Further, there are many applications in the radio map predictions. Base station assignment and user-cell site association is one such application. Since radio maps provide information of how the received signal is spatially distributed, these can be used to position base stations optimally and decide which UEs (User Equipments) are assigned to which base station. Another application is in device to device link scheduling. A particular UE may unintentionally communicate with an unknown receiver: This causes interference with the actual receiver. In order to avoid this, optimal strategies exist to schedule such a link to reduce the interference levels. Radio maps are expected to be an essential tool for the resource optimization and management of 5G automotive. The immense 5G network would integrate a vast number of heterogeneous networks supporting an increasingly diverse set of services, applications and users from mobile users to IoT. In the meantime, on the quest for offloading the 5G users from spectrum management and thus reducing computation and energy consumption, Radio Maps works as a collaborative tool residing in the network.

It is believed radio maps are essential to the fifth generation (5G) network resource management. However, a frequent radio map update is expensive and inefficient practically because of requiring a measurement collection from many devices.

Thus, it is desired to address the above mentioned disadvantages or other shortcomings or at least provide a useful alternative.

SUMMARY

Embodiments of the disclosure provide a method and a network apparatus for generating a real-time radio coverage map in a wireless network.

Embodiments of the disclosure provide radio map estimation using a generative adversarial network.

Embodiments of the disclosure aggregate data from multiple sources (e.g., maps, weather, other base stations (BSs)) to generate the radio map.

Embodiments of the disclosure develop neural network model which is computationally efficient and capable of real time radio map generation.

Embodiments of the disclosure use different training mechanisms like generative adversarial networks and federated learning to train the neural network model.

Accordingly, an example embodiment herein provides a method for generating a real-time radio coverage map in a wireless network. The method includes: receiving, by a network apparatus in the wireless network, real-time geospatial information from one or more geographical sources in the wireless network; determining, by the network apparatus, handover information of at least one user equipment (UE) in the wireless network from a plurality of base stations based on the real-time geospatial information; and generating, by the network apparatus, the real-time radio coverage map based on the handover information of at least one UE and the real-time geospatial information.

In an example embodiment, the geographical sources includes at least one of a satellite image system for capturing a geographical image of at least one geographical area associated with the one or more geographical sources, drones to capture real time images of the at least one geographical area associated with the one or more geographical sources, drive test system to determine drive test information in the at least one geographical area associated with the one or more geographical sources, a two dimensional (2D) and a three dimensional (3D) geospatial map system for generating 2D and 3D geospatial map of the at least one geographical area associated with the one or more geographical sources, a traffic monitoring system for monitoring real-time traffic data of the at least one geographical area associated with the one or more geographical sources, or a weather monitoring system for determining weather information of the at least one geographical area associated with the one or more geographical sources.

In an example embodiment, the real-time geospatial information includes at least one of at least one geographical area associated with the one or more geographical sources, a 2D and 3D geospatial map of the at least one geographical area associated with the one or more geographical sources, real-time traffic data of the at least one geographical area associated with the one or more geographical sources, weather information of the at least one geographical area associated with the one or more geographical sources, or drive test information identifying at least one of areas with no cellular connectivity, handover issues, call drops, low throughputs, or no data.

In an example embodiment, generating, by the network apparatus, the real-time radio coverage map based on the handover information of at least one UE and the real-time geospatial information includes feeding, by the network apparatus, the real-time geospatial information and the handover information onto the at least one Machine Learning (ML) model, marking, by the network apparatus, a location of the plurality of base stations in the wireless network from the real-time geospatial information using the at least one ML model, determining, by the network apparatus, material characteristic of objects in the location of the plurality of base stations in the wireless network based on the real-time geospatial information using the at least one ML model, wherein the material characteristic comprises number of buildings, tree density, landscape data, and structure of objects, and generating, by the network apparatus, the real time radio coverage map using the at least one ML model based on the material characteristic of the objects, the real-time geospatial information, and the handover information of at least one UE.

In an example embodiment, the method includes training, the network apparatus, the at least one ML model by receiving multiple inputs from the plurality of the geographical sources in the wireless network while rendering the radio maps in real time and creating a dataset by collecting the multiple inputs, collecting information associated with the base station and a corresponding radio-map in a situation, and collecting an information for a geospatial data and weather and satellite data. Further, the at least one ML model is trained by feeding the input (e.g., geospatial data, weather, satellite data from a base station location). The output of the neural network is a radiomap which is compared with the real radiomap collected from the base station. The difference between the generated radiomap and the real radiomap is used to update the at least one ML model.

Further, the radio maps information is shared either on request or configured basis (e.g., periodically or aperiodically). The disclosed method can use other forms of neural network also instead of CNN. Dense neural network and recurrent neural network can also be deployed.

In an example embodiment, the method includes: receiving, by the network apparatus, a plurality of real-time radio coverage map generated by other network apparatuses in the wireless network, wherein each real-time radio coverage map of the plurality of real-time radio coverage maps comprises local data of the UEs connected to local network apparatus of the other network apparatuses; receiving, by the network apparatus, the trained weights of each real-time radio coverage map of the plurality of real-time radio coverage maps from each of the network apparatuses in the wireless network; aggregating, by the network apparatus, the trained weights of each real-time radio coverage map of the plurality of real-time radio coverage maps; generating, by the network apparatus, a global ML model based on the trained weights of each real-time radio coverage map of the plurality of real-time radio coverage maps; and sending, by the network apparatus, the global ML model to each of the network apparatuses in the wireless network for generating the real-time radio coverage map.

In an example embodiment, the at least one ML model is hosted in at least one of a base station in the wireless network, a virtualized radio access networks (vRANs) in the wireless network, open radio access network (O-RAN) in the wireless network, or a cloud radio access network (CRAN) in the wireless network.

In an example embodiment, the method includes: determining, by the network apparatus, whether shadow regions in the real-time radio coverage map due to which coverage is limited in location of the base stations in the wireless network. In an example, one the radiomap is generated, the machine learning agent identifies the network shadow region using the intensity of the highlighted region on the radiomap. Further, the method includes: determining, by the network apparatus, at least one remedial action to be performed to improvise the coverage in location of the base stations based on at least one of antenna tilt, modulation and coding scheme, or transmission mode; and automatically performing, by the network apparatus, the at least one remedial action in location of the base stations in the wireless network. This radio map solution (e.g., maps 2D or maps 3D) can be used by various layers for scheduling or/and computing the optimal Modulation & coding scheme or/and Number of Resource blocks and/or sub-carrier spacing and/or Bandwidth part and/or transmit power and/or antenna tilt and/or operations & management layer or/and call processing and/or other layers in 2G/3G/5G/6G/any communication systems. Some of the layers might be sitting in the base station or edge cloud or centralized cloud.

In an example embodiment, the at least one remedial action includes changing antenna parameters of at least one radio resource for the at least one UE in the wireless network, and increasing or decreasing a power of at least one radio resource for the at least one UE in the wireless network, deploying the at least one radio resource for the at least one UE in the wireless network, and removing the at least one radio resource for the at least one UE in the wireless network, In an example embodiment, the antenna parameters includes at least one of an orientation, a tilt angle, or a height of the antenna.

In an example embodiment, the at least one radio resource includes a base station, a drone, a macro cell, and a small cell.

In an example embodiment, the shadow regions in the real-time radio coverage map is determined using a convolutional neural network (CNN).

In an example embodiment, the method comprises: training the CNN for determining the shadow regions by creating a dataset by collecting the multiple inputs, collecting information associated with the base station and a corresponding radio-map in a situation, and collecting an information for a geospatial data and weather and satellite data; wherein the at least one CNN is trained by feeding the input (e.g., geospatial data, weather, satellite data from a base station location). The output of the neural network is a radiomap which is compared with the real radiomap collected from the base station. The difference between the generated radiomap and the real radiomap is used to update the at CNN.

In an example embodiment, the network apparatus is one of a base station, a centralized server handling different base stations in the wireless network, a virtualized radio access networks (vRANs), open radio access network (O-RAN), a cloud radio access network (CRAN), a distributive server handling different base stations in the wireless network, and an edge server handling different base stations in the wireless network.

Accordingly, an example embodiment herein provides a network apparatus configured to generate a real-time radio coverage map in a wireless network. The network apparatus includes: a memory comprising information of cells and user equipments (UEs) available in the wireless network, a processor connected to the memory, and a real-time radio coverage map controller, communicatively connected to the memory and the processor. The real-time radio coverage map controller is configured to: receive real-time geospatial information from one or more geographical sources in the wireless network; determine handover information of at least one UE in the wireless network from a plurality of base stations based on the real-time geospatial information; and generate the real-time radio coverage map based on the handover information of at least one UE and the real-time geospatial information.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the scope thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
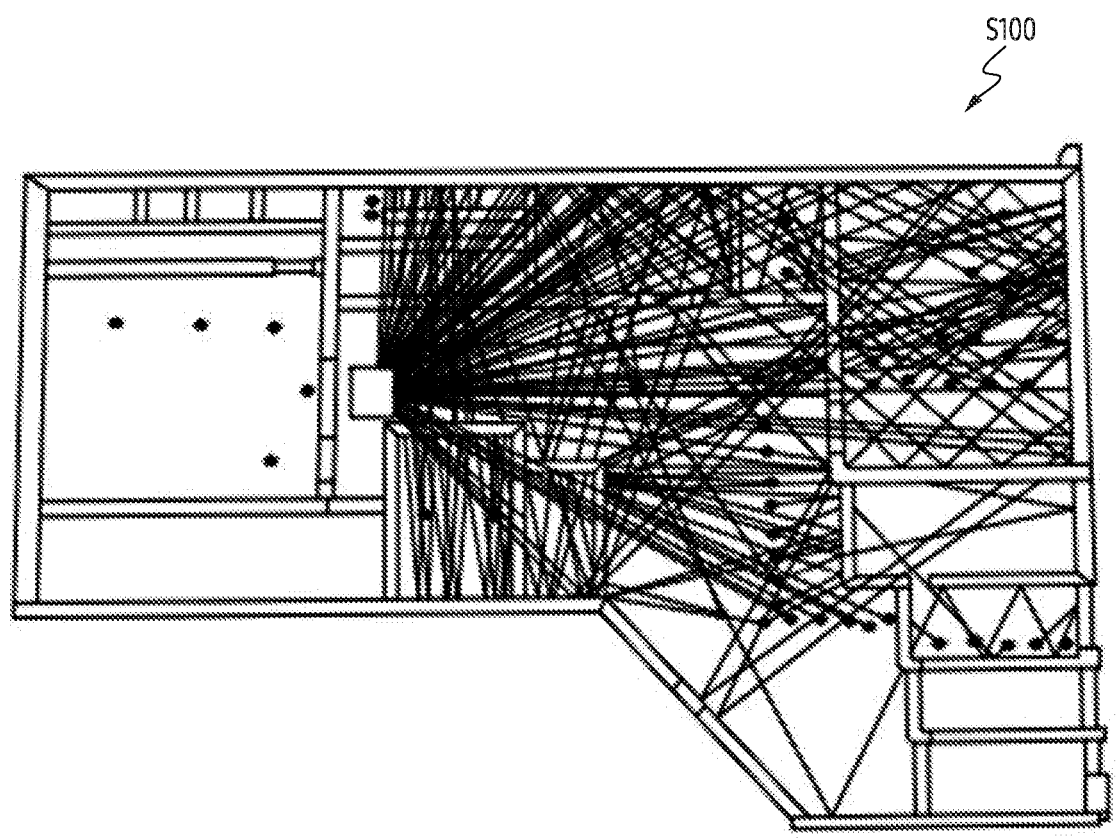
FIG. 1 is a diagram illustrating an example representation of wave fronts as simple particles, according to the prior art.

The various example embodiments herein and the various features and advantageous details thereof are explained in greater detail below with reference to the non-limiting example embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly example embodiments herein provide a method for generating a real-time radio coverage map in a wireless network. The method includes receiving, by a network apparatus in the wireless network, real-time geospatial information from one or more geographical sources in the wireless network. Further, the method includes determining, by the network apparatus, handover information of at least one UE in the wireless network from a plurality of base stations based on the real-time geospatial information. Further, the method includes generating, by the network apparatus, the real-time radio coverage map based on the handover information of at least one UE and the real-time geospatial information.

The disclosed method provides a deep learning approach to predict radio maps which show how radio waves propagate through buildings and roads given the power and location of the transmitter. Further, the disclosed method provides a model which gives highly accurate results compared to a base line model that is trained on a similar dataset. Further, the disclosed method provides a method of neat regularization process in order to avoid over-fitting which is very common among deep neural networks.

The disclosed method provides an AI-based real environment recognition and automatic 3D map reconstruction. The disclosed method takes into account even micro-scale objects such as trees and poles that traditional tools omit to provide exact analysis, especially for the mmWave spectrum since its signal propagation is significantly impacted by such objects. The planner leverages deep learning technologies, gathering satellite and street-side photographs to extract environmental details, including shapes of trees, surface material of buildings and heights of utility poles or street lamps.

In the disclosed method, training of the neural network is done using generative adversarial networks (GAN) mechanism. The GAN mechanism allows the model to take multiple inputs and still render radiomaps in real time. The disclosed method is better in terms of computational complexity and accuracy, so as to provide an enhanced quality of experience for the user.

The disclosed method can be used in radio map estimation in heterogeneous LTE architecture of macrocells and femtocells. In the vast heterogeneous 5G network the Radio map estimation module deployment should keep up-to-date the long and short term information in order to efficiently support the network and maintain the data rates, latency, QoE required levels of performance.

Referring now to the drawings and more particularly to FIGS. 2 through 12, where similar reference characters denote corresponding features consistently throughout the figures, there are shown various example embodiments.

Figure 2:
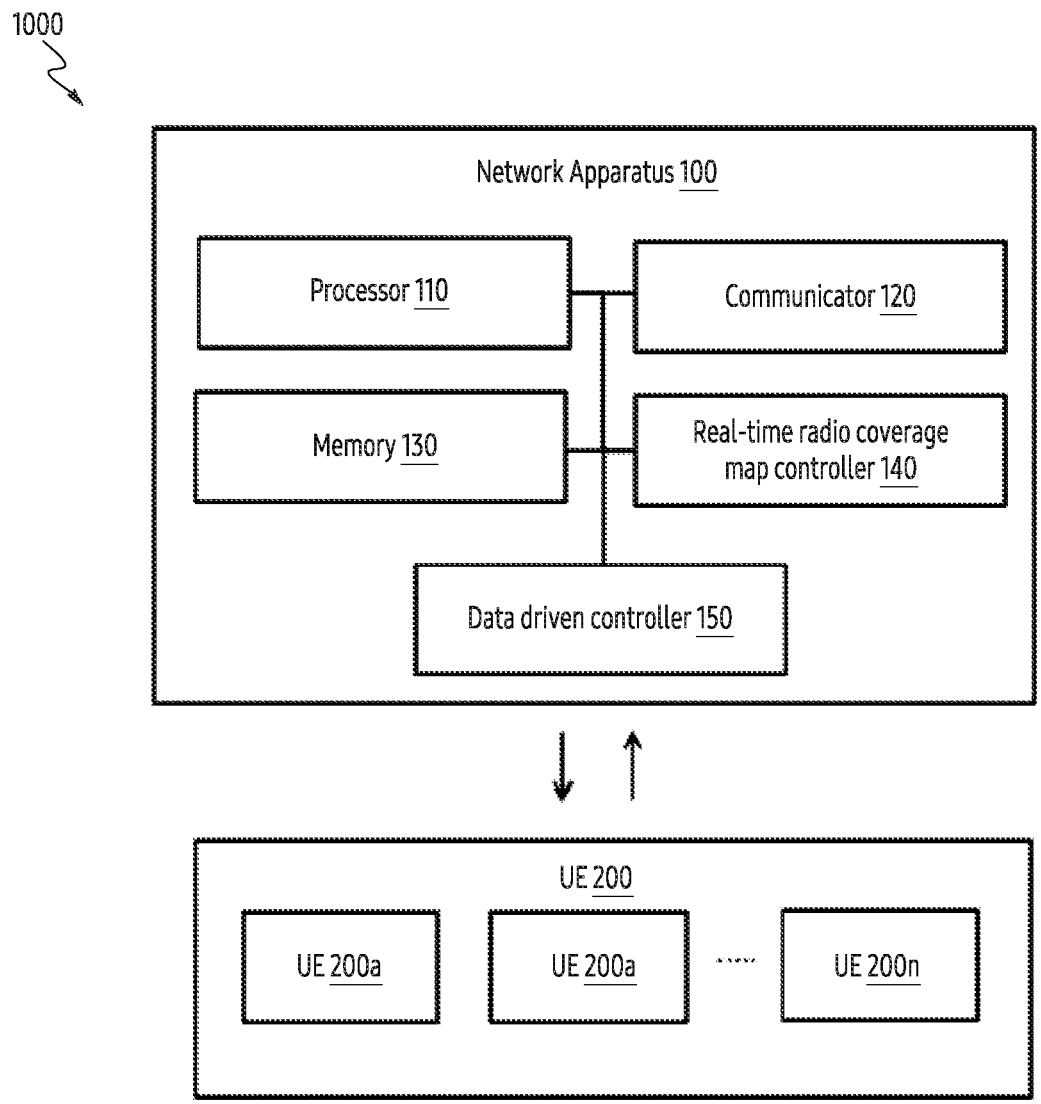
FIG. 2 is a block diagram illustrating an example configuration of a network apparatus for generating a real-time radio coverage map in a wireless network, according to various embodiments.

FIG. 2 is a block diagram illustrating an example configuration of a network apparatus (100) for generating a real-time radio coverage map in a wireless network (1000), according to various embodiments. In an embodiment, the wireless network (1000) includes the network apparatus (100) and a plurality of UE (200a-200n). Hereafter, the label of the UE is 200. The UE (200) can be, for example, but not limited to a cellular phone, a smart phone, a personal digital assistant (PDA), a tablet computer, a laptop computer, an internet of things (IoT), embedded systems, edge devices, a V2X device or the like. The network apparatus (100) can be, for example, but not limited to a base station, a centralized server handling different base stations in the wireless network (1000), a virtualized radio access networks (vRANs), an open radio access network (O-RAN), a cloud radio access network (CRAN), a distributive server handling different base stations in the wireless network (1000), and an edge server handling different base stations in the wireless network (1000).

In an embodiment, the network apparatus (100) includes a processor (e.g., including processing circuitry) (110), a communicator (e.g., including communication circuitry) (120), a memory (130), a real-time radio coverage map controller (e.g., including various processing and/or control circuitry) (140), and a data driven controller (e.g., including various processing and/or control circuitry) (150). The processor (110) is coupled with the communicator (120), the memory (130), the real-time radio coverage map controller (140) and data driven controller (150).

The real-time radio coverage map controller (140) receives real-time geospatial information from one or more geographical sources in the wireless network (1000). The geographical sources can be, for example, but not limited to a satellite image system for capturing a geographical image of at least one geographical area associated with the one or more geographical sources, drones to capture real time images of the at least one geographical area associated with the one or more geographical sources, drive test system to determine drive test information in the at least one geographical area associated with the one or more geographical sources, a 2D and 3D geospatial map system for generating 2D and 3D geospatial map of the at least one geographical area associated with the one or more geographical sources, a traffic monitoring system for monitoring real-time traffic data of the at least one geographical area associated with the one or more geographical sources, and a weather monitoring system for determining weather information of the at least one geographical area associated with the one or more geographical sources. The real-time geospatial information can be, for example, but not limited to a satellite image of at least one geographical area associated with the one or more geographical sources, a 2D and 3D geospatial map of the at least one geographical area associated with the one or more geographical sources, real-time traffic data of the at least one geographical area associated with the one or more geographical sources, weather information of the at least one geographical area associated with the one or more geographical sources, and drive test information identifying at least one of areas with no 4G connectivity, handover issues, call drops, low throughputs, or no data.

Based on the real-time geospatial information, the real-time radio coverage map controller (140) determines handover information of at least one UE (200) in the wireless network (1000) from the plurality of base stations. Based on the handover information of at least one UE (200) and the real-time geospatial information, the real-time radio coverage map controller (140) generates the real-time radio coverage map In an embodiment, the real-time radio coverage map controller (140) feeds the real-time geospatial information and the handover information onto the at least one ML model. Further, the real-time radio coverage map controller (140) marks a location of the plurality of base stations in the wireless network (1000) from the real-time geospatial information using the at least one ML model. Further, the real-time radio coverage map controller (140) determines material characteristic of objects in the location of the plurality of base stations in the wireless network (1000) based on the real-time geospatial information using the at least one ML model. The material characteristic includes a number of buildings, tree density, landscape data, and structure of objects. Further, the real-time radio coverage map controller (140) generates the real time radio coverage map using the at least one ML model based on the material characteristic of the objects, the real-time geospatial information, and the handover information of at least one UE.

Further, the real-time radio coverage map controller (140) trains the at least one ML model by receiving multiple inputs from the plurality of the geographical sources in the wireless network (1000) while rendering the radio maps in real time, creating a dataset by collecting the multiple inputs, collecting information associated with the base station and a corresponding radio-map in a situation, and collecting an information for a geospatial data and weather and satellite data. Further, the at least one ML model is trained by feeding the input (e.g., geospatial data, weather, satellite data from a base station location). The output of the neural network is a radiomap which is compared with the real radiomap collected from the base station. The difference between the generated radiomap and the real radiomap is used to update the at least one ML model.

Further, the radio maps information is shared either on request or configured basis (e.g., periodically or aperiodically). The disclosed method can use other forms of neural network also instead of CNN. Dense neural network and recurrent neural network can also be deployed.

Further, the real-time radio coverage map controller (140) receives a plurality of real-time radio coverage map generated by other network apparatuses in the wireless network (1000). Each real-time radio coverage map of the plurality of real-time radio coverage maps comprises local data of the UEs connected to a local network apparatus of the other network apparatuses. Further, the real-time radio coverage map controller (140) receives the trained weights of each real-time radio coverage map of the plurality of real-time radio coverage maps from each of the network apparatuses in the wireless network (1000). Further, the real-time radio coverage map controller (140) aggregates the trained weights of each real-time radio coverage map of the plurality of real-time radio coverage maps. Further, the real-time radio coverage map controller (140) generates a global ML model based on the trained weights of each real-time radio coverage map of the plurality of real-time radio coverage maps. Further, the real-time radio coverage map controller (140) sends the global ML model to each of the network apparatuses in the wireless network (1000) for generating the real-time radio coverage map.

The at least one ML model is hosted in at least one of a base station in the wireless network (1000), a virtualized radio access networks (vRANs) in the wireless network (1000), an open radio access network (O-RAN) in the wireless network (1000), or a cloud radio access network (CRAN) in the wireless network (1000).

Further, the real-time radio coverage map controller (140) determines whether shadow regions in the real-time radio coverage map due to which coverage is limited in location of the base stations in the wireless network (1000). The shadow regions in the real-time radio coverage map is determined using a convolutional neural network (CNN). In an example, the base station will utilize the users channel condition information to figure it out, whether there is any unexpected change in the signal to interference plus noise ratio (SINR)/signal-to-noise ratio (SNR)/received signal strength indicator (RSSI)/reference signal received quality (RSRQ)/reference signal received power (RSRP) etc. The base station can utilize the other parameters like acknowledge/non-acknowledge (ACK/NACK) statistics, modulation and coding scheme (MCS) statistics, rank index stats, expected & received SINR information, other communication system parameters. In an example, one the radiomap is generated, the machine learning agent identifies the network shadow region using the intensity of the highlighted region on the radiomap. Further, the real-time radio coverage map controller (140) determines at least one remedial action to be performed to improvise the coverage in location of the base stations based on at least one of antenna tilt, modulation and coding scheme, or transmission mode. In an example, the Radio map solution (e.g., maps 2D or maps 3D) can be used by various layers for scheduling or/and computing the optimal Modulation & coding scheme or/and Number of Resource blocks and/or sub-carrier spacing and/or Bandwidth part and/or transmit power and/or antenna tilt and/or operations & management layer or/and call processing and/or other layers in 2g/3g/5g/6g/any communication systems. Some of the layers might be sitting in the base station or edge cloud or centralized cloud. This radio map information can exchanged across/neighbouring base stations/with cloud RAN to determine the optimal antenna tilts and transmit parameters with or without co-ordination. One can address this problem using centralized or distributed based approaches. Further, the real-time radio coverage map controller (140) automatically performs the at least one remedial action in location of the base stations in the wireless network (1000). The at least one remedial action includes changing antenna parameters of at least one radio resource for the at least one UE (200) in the wireless network (1000), and increasing or decreasing a power of at least one radio resource for the at least one UE (200) in the wireless network (1000), deploying the at least one radio resource for the at least one UE (200) in the wireless network (1000), and removing the at least one radio resource for the at least one UE (200) in the wireless network (1000). The antenna parameters includes at least one of an orientation, a tilt angle, or a height of the antenna. The at least one radio resource comprises a base station, a drone, a macro cell, and a small cell.

Further, the real-time radio coverage map controller (140) trains the CNN for determining the shadow regions by creating a dataset by collecting the multiple inputs, collecting information associated with the base station and a corresponding radio-map in a situation, and collecting an information for a geospatial data and weather and satellite data. Further, the at least one CNN is trained by feeding the input (e.g., geospatial data, weather, satellite data from a base station location). The output of the neural network is a radiomap which is compared with the real radiomap collected from the base station. The difference between the generated radiomap and the real radiomap is used to update the at CNN.

The real-time radio coverage map controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The memory (130) stores information of cells and UEs available in the wireless network (1000). The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using the data driven controller (150). The data driven controller (150) can be a ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning may refer, for example, to a predefined operating rule or AI model of a desired characteristic being made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 shows various hardware components of the network apparatus (100) it is to be understood that other embodiments are not limited thereon. In other embodiments, the network apparatus (100) may include less or more number of components. Further, the labels or names of the components are used only for illustrative purpose and does not limit the scope of the disclosure. One or more components can be combined together to perform same or substantially similar function in the network apparatus (100).

Figure 3:
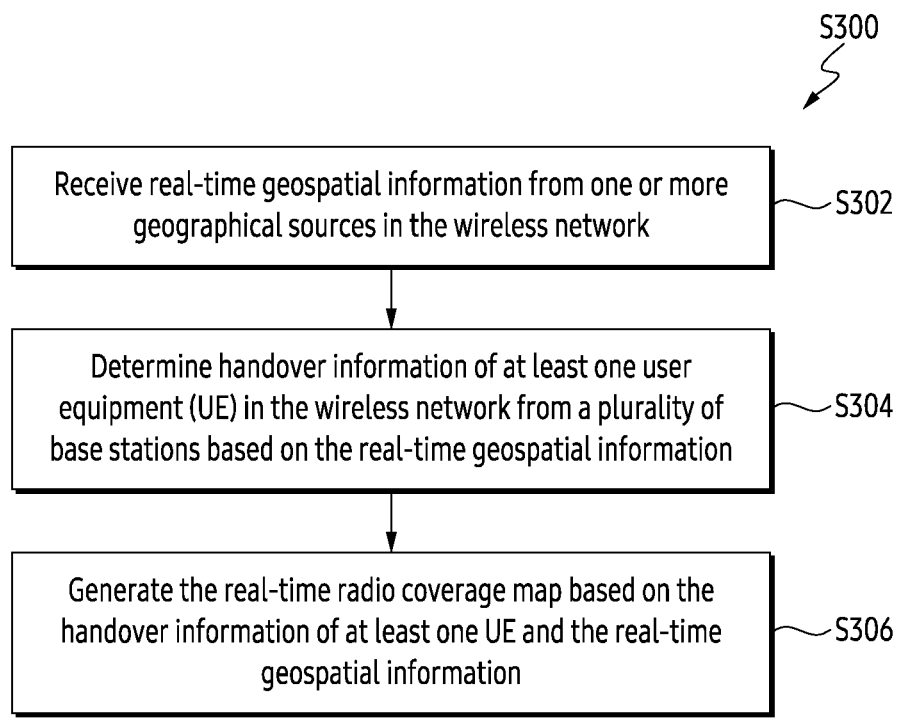
FIG. 3 and FIG. 4 are flowcharts illustrating example methods for generating the real-time radio coverage map in the wireless network, according to various embodiments.
Figure 4:
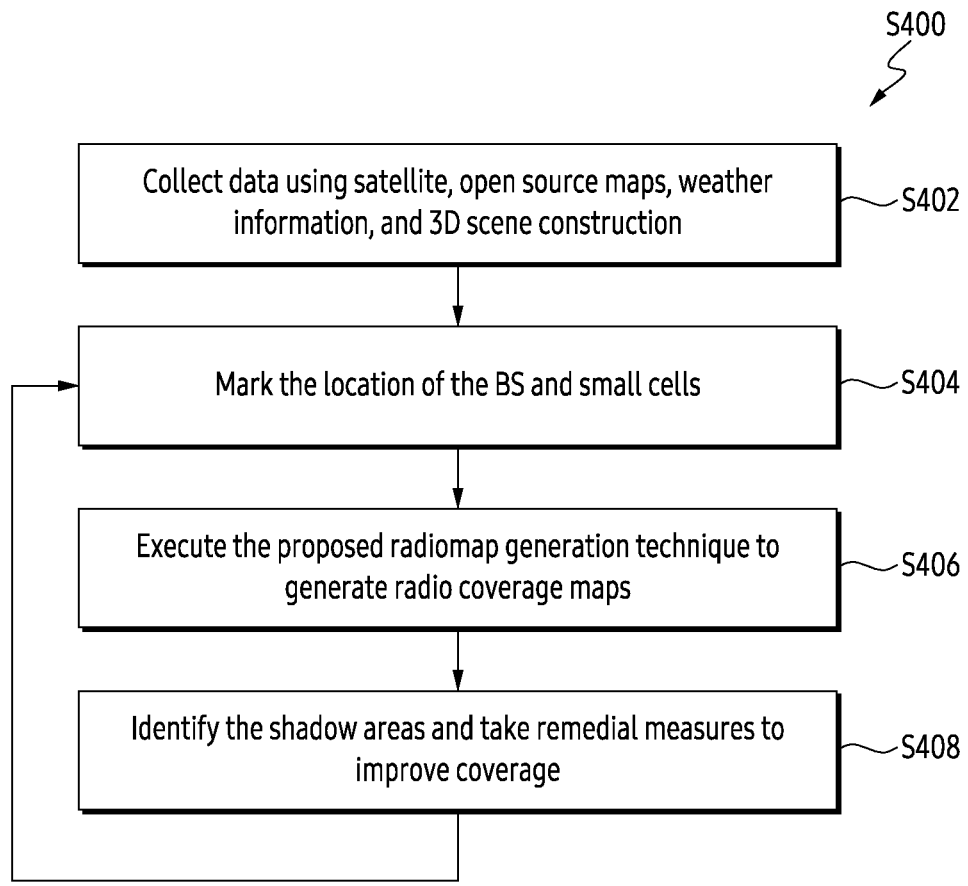

FIG. 3 and FIG. 4 are flowcharts (S300 and S400) illustrating example methods for generating the real-time radio coverage map in the wireless network (1000), according to various embodiments.

As shown in FIG. 3, the operations (S302-S306) are handled by the real-time radio coverage map controller (140). At S302, the method includes receiving the real-time geospatial information from one or more geographical sources in the wireless network (1000). At S304, the method includes determining the handover information of at least one UE (200) in the wireless network (1000) from the plurality of base stations based on the real-time geospatial information. At S306, the method includes generating the real-time radio coverage map based on the handover information of at least one UE (200) and the real-time geospatial information.

As shown in FIG. 4, the operations (S402-S408) are handled by the real-time radio coverage map controller (140). At S402, the method includes collecting the data using the satellite, the open source maps, the weather information, and the 3D scene construction. At S404, the method includes marking the location of the BS and small cells. At S406, the method includes execute the disclosed radiomap generation technique (as shown in FIG. 3) to generate the radio coverage maps. At S408, the method includes identifying the shadow areas and take remedial measures to improve coverage.

Unlike the conventional methods and systems, the disclosed method provides a highly accurate deep learning technique to predict the propagation path loss from any point on a planar domain with respect to the transmitter in terms of radio map estimation. Further, the disclosed method adopts the generative adversarial network to yield precise path loss estimations. The simulation results show that the disclosed method can produce the path loss estimations that very close to ray tracing simulation but are computationally more efficient. Zero touch networks can utilize the radio map for adjusting the RAN parameters like tilt, power to get high quality of service.

Unlike the conventional methods and systems, the disclosed method uses machine learning models to extract additional information like the material building, trees density etc. This reduces the dependency of manual mapping of the environment. The disclosed ML model is able to develop the environment from the openly available data only. The disclosed method also takes into consideration the weather map to further increase the efficacy of the radio maps.

Figure 5:
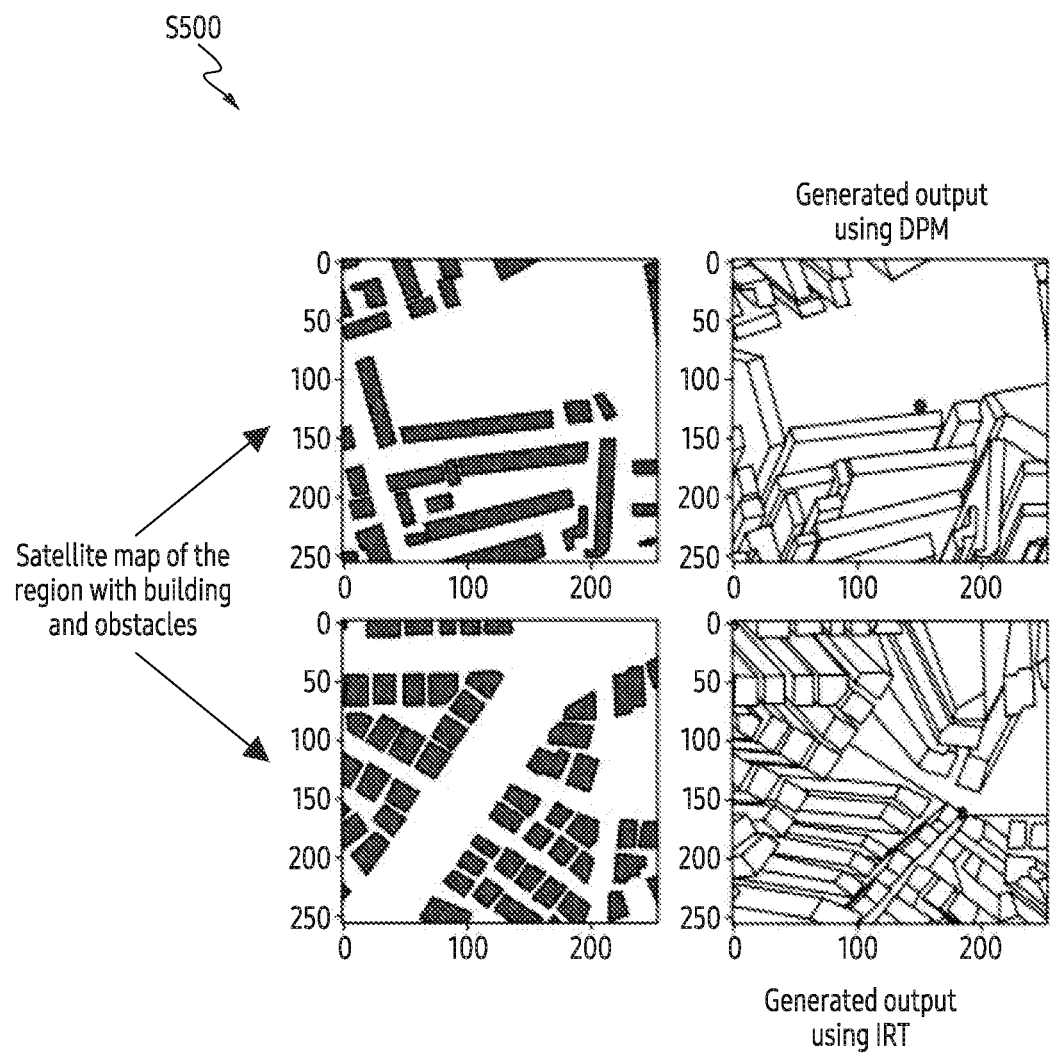
FIG. 5 is a diagram illustrating an example of a radio map dataset, according to various embodiments.

FIG. 5 is a diagram illustrating an example (S500) of a radio map dataset, according to various embodiments. Referring to FIG. 5, images on the left are the maps while the corresponding masks are on the right. In an example, the entire dataset includes, for example, 700 maps with 80 transmitter location giving a total of 56,000 images. There are two variations of this dataset, cars and missing buildings. The cars dataset is used to account for mobile obstacles typical in an urban environment, while the missing buildings dataset is used to regularize the model. For carrying out a semantic segmentation task in a supervised framework, the disclosed method also need the actual radio maps or ground truth. In computer vision terminology, these are called masks.

Masks can be generated using existing methods such as dominant path model (DPM) and Intelligent ray tracing2/4 (IRT2/IRT4). The dominant path model (DPM) takes into account that the received signal strength is the sum total of the contributions made from all the rays emitted from the transmitter and which reach the receiver. However, it assumes that not all the rays contribute equally to the received signal strength (RSS). In fact only subsets of the reflected rays have a dominant contribution. It restricts its scope to only the dominant paths and ignores rays with small energy input. The loss prediction is given by, $$L = 20\log\left(\frac{4\pi}{\lambda}\right) + 10p\log(l) + \sum_{i=1}^{k} f(\Phi, i) + \sum_{j}^{m} t_j - \Omega \quad (2)$$

In the above equation, $\lambda$ is the wavelength, p is the visibility factor, $f(\Phi,i)$ is function that describes the interaction loss in dB. l is the path length in meters, tj is the transmission loss with wall j and $\Omega$ is the wave guiding factor.

In another example, a smaller dataset is also generated using Intelligent Ray Tracing by considering 4 interactions. These are highly accurate simulations and are used to fine tune the model. The heights of the transmitters, receivers and buildings are also fixed at 1.5 m, 1.5 m and 25 m respectively. All the components of the data set, the maps and the masks are of size 256×256.

Given below, are the images and masks of a few scenarios out of a possible 56,000. The images of the maps have binary pixel values e.g., (0 or 1). Regions inside the building have a pixel value of 1 and the exteriors have pixel value 0. The masks are the radio maps and the pixel values denote the path loss. These pixel values have values between 0 and 1. This is done by gray level conversion, $$P_L^{pixel} = \max\left(\frac{P_L - P_{L,truncated}}{M - P_{L,truncated}}, 0\right) \quad (3)$$

In the above equation, $P_{L,truncated}$ is a threshold value which has a value of −147 dB. M is the maximum gain in the dataset and PL is the path loss. In this way, any value below the threshold will automatically be assigned a 0. The reason is that any signal with power below this noise floor, would have a very small contribution to the actual received power. If this scaling was not done, very weak signals would have a very high value of path loss with a negative sign and thereby dominate the radio map. Since this is not the case, this is a very important step. The stronger signals with higher gains are translated to values very close to 1 and thereby are more important.

Apart from these simulations which contain 56,000 images there is a smaller dataset which has been generated using IRT4 simulations. These contain the same 700 maps but only 2 transmitter locations giving a total of 1400 images and corresponding masks. These are very accurate maps and will be used for fine tuning the model. The next section will be dedicated to the neural network architecture and the training scheme.

Figure 6:
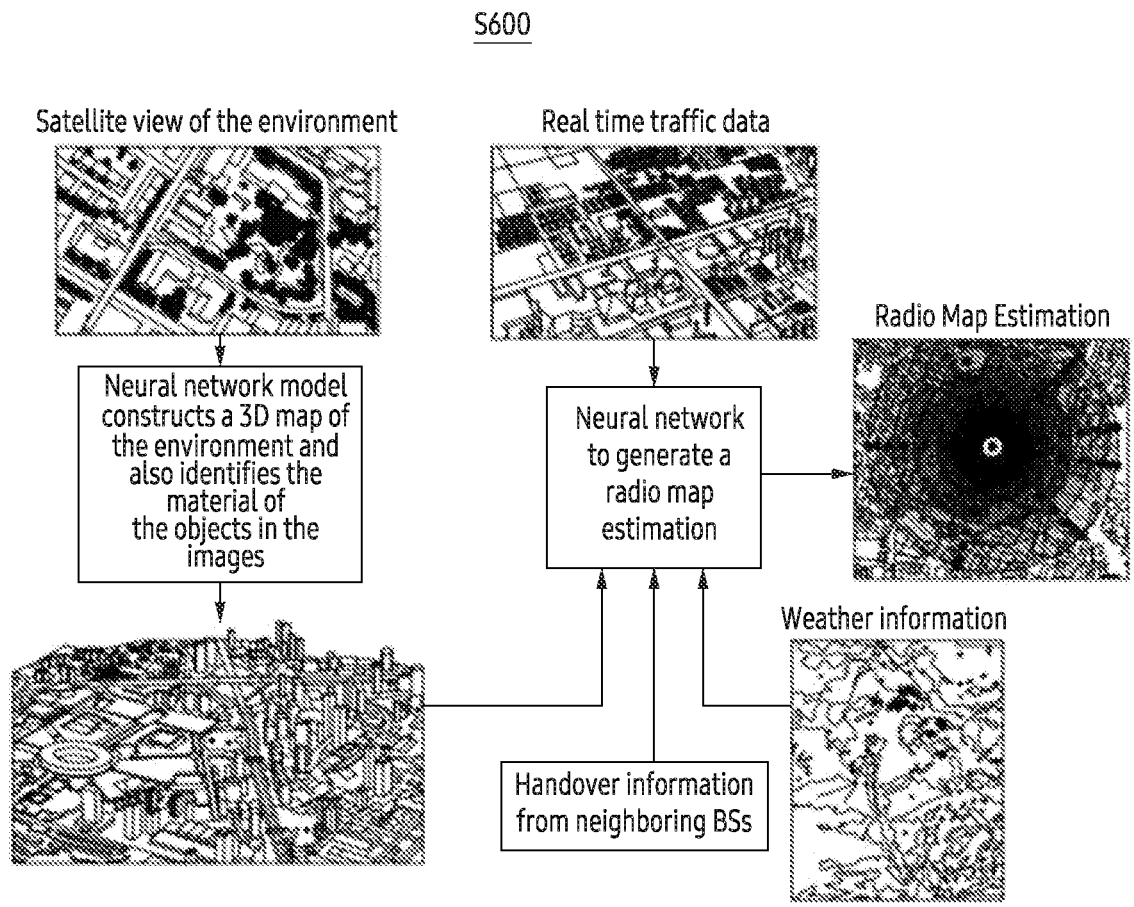
FIG. 6 is a diagram illustrating an example of a radio map estimation using a ML model, according to various embodiments.
Figure 7:
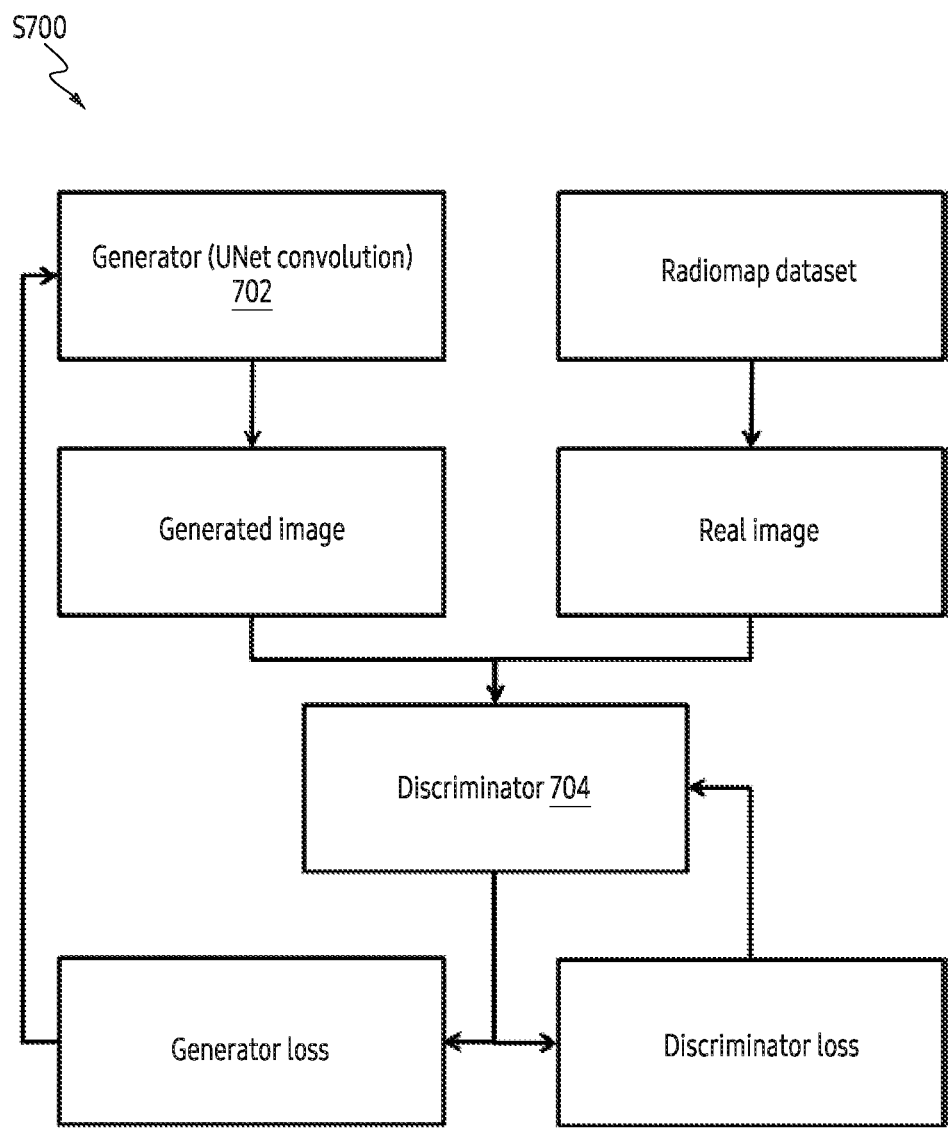
FIG. 7 is a diagram illustrating an example scenario of a radio map estimation using a neural network model, according to various embodiments.
Figure 8:
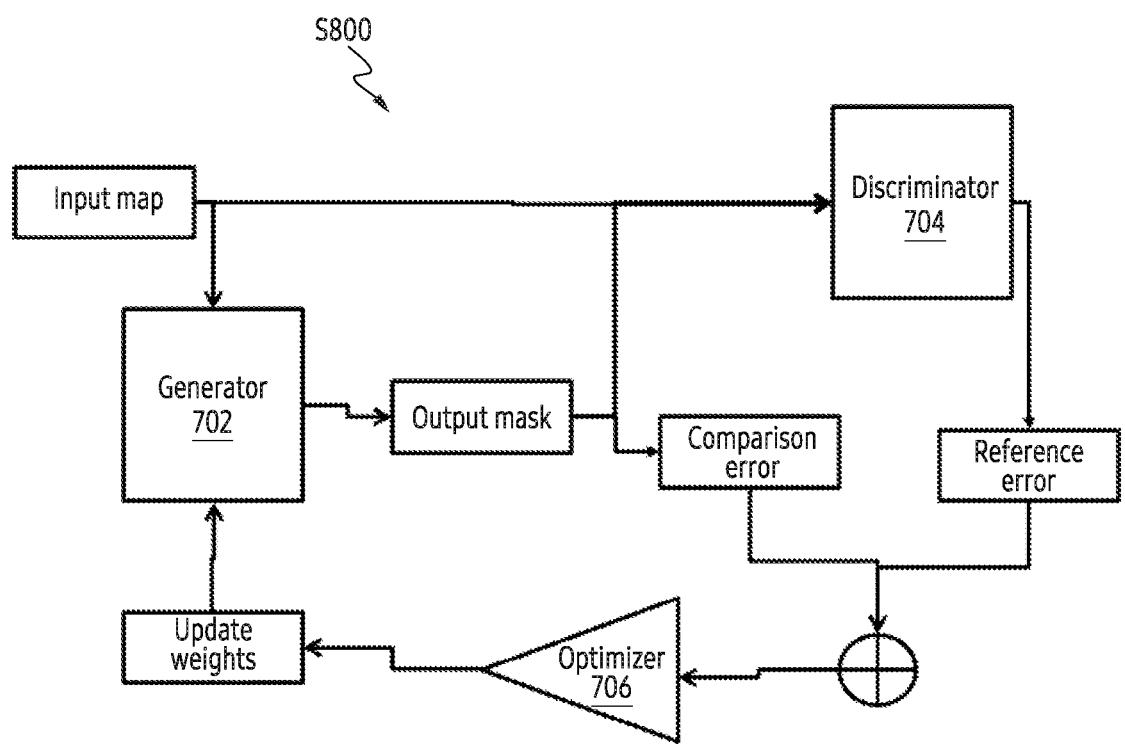
FIG. 8 is a diagram illustrating an example scenario of a radio map estimation using a GAN architecture, according to various embodiments.

FIG. 6 is a diagram illustrating an example scenario (S600) of a radio map estimation using the ML model, according to various embodiments. FIG. 7 and FIG. 8 are diagrams illustrating example scenarios (S700 and S800) of the radio map estimation using the neural network the model and GAN architecture, according to various embodiments.

As shown in FIG. 6, the satellite image is gathered from open source platform like maps. This is passed though software like 3D mapping tools or AI based approaches like using neural network to obtain a 3D geospatial map. The 3D Geospatial map captures the 3D view of the area encompassing buildings, trees, and other objects. The real time traffic data is collected using online maps, online traffic updates and online weather information. The Radio-map estimation is done using ML model, based on the satellite image, the 3D Geospatial map, and the real time traffic data.

Referring to FIGS. 6 and 7, the convolutional neural networks (CNN) can be used to carry out the task of generating 3D images and segmenting objects according to the material (like the building is made up of glass or brick). The disclosed method passes three images to the neural network-3D reconstruction of the landscape, traffic details, weather information. The CNN process the input and uses the trained weights to generate a radio map/path loss map. The radio map can then be used to alter the design and deployment of the RAN system. The NN solution can be deployed in edge cloud or the central cloud according to the requirement. With GPUs available in VRAN/CRAN systems for processing, the neural network (NN) models can be utilized efficiently.

In the NN, the training can be done in following methods:
1. Normal training—the input is provided to the model and the NN's output is compared with the real output. The loss is then used for back prorogation.
2. Conditional generative adversarial networks—in this method, the generator (702) (a CNN model) are trained to generate the radio map using a min sum game strategy.

Referring to FIG. 8, the disclosed model is deep convolutional neural network. For an image dataset, the CNNs have been the common course of action. This is because CNNs have the ability to isolate local features of an image and thereby create very good representations of the input. Once these representations are learnt, the model can be optimised for carrying out any downstream task such as classification, semantic segmentation, object detection etc. by changing the architecture. For this problem statement, the disclosed method provides a GAN architecture for the segmentation task.

In deep learning convolutional neural networks or CNNs is spatially invariant architecture that exploit the hierarchical structure of data. In CNN with many hidden layers, the complexity of learnt features increases as the input propagates through the network. The CNN includes kernels or filters that slide across the inputs to generate outputs for the next layer. Kernels are nothing but tensors which convolve with the input. This process of interacting with the input by means of a sliding window help preserve the local features of an image.

A generative adversarial network or GAN is a novel scheme of training models which is motivated by game theory. It includes two networks, a generator (702) and a discriminator (704). The generator (702) is responsible for generating the image masks by taking maps as an input. The discriminator (704) has one task: to differentiate which mask was generated by the network and which belongs to the real dataset. Initially, the discriminator D (704) is clearly able to segregate the distributions however with the number of iterations this task gets increasingly difficult. Thus the two networks learn in a competitive manner, since the generator (702) gets better at creating the fake images and attempts to closely imitate the real distribution.

The GANs can also be used to carry out an image-to-image translation task which is precisely what the disclosed model does. This task involves learning the mapping between an input and output image. The disclosed model would essentially learn how the radio waves propagate through free space and obstacles by assessing the input map of buildings and roads.

Recently, GAN-based methods have been widely used in image-to-image translation and produced appealing results. In pix2pix, conditional GAN (cGAN) was used to learn a mapping from an input image to an output image, cGAN learns a conditional generative model using paired images from source and target domains. Similarly, DiscoGAN and DualGAN use an unsupervised learning approach for image-to-image translation based on unpaired data, but with different loss functions. HarmonicGAN disclosed a solution for unpaired image-to-image translation introduces spatial smoothing to enforce consistent mappings during translation. The disclosed method employs the image to image utility of the GANs for generating the radio maps.

Map2Radio Model: the Map2Radio Model provides a detailed description of the disclosed model which is based on the state of the art pix2pix architecture. In the first subsection discriminator (704) which is followed by the generator (702) is described. In this architecture, the disclosed method also applies a state of the art regularization scheme called manifold mix up.

1. Discriminator: The discriminator (704) includes many convolutional blocks. Each such block is a sequential model which includes the following,
   i. 2-D Convolutional Layer: This is parameterised by the number of in channels and out channels as well as the filter size and stride.
   ii. Batch Normalization: This is regularization heuristic so that the distribution of weights and biases is stable using an optimizer (706) after every update for every mini batch.
   iii. Leaky ReLU: This is a modification of the ReLU non linear activation function. This is characterised by a threshold value below which all values are mapped to 0 else the value itself.

In the below Table (1), 2D convolution refers to a single convolution layer with in channels and out channels. Convolutional block refers to the sequence described above it is characterised by the channels, out channels and the threshold value of the activation function.

TABLE 1

Discriminator architecture

| Layer | Description | Hyper-parameters |
|---|---|---|
| 1 | 2D Convolution | (2, 64) |
| 2 | Convolutional Block | (64, 128, 0.7) |
|   | Convolutional Block | (128, 256, 0.8) |
| 4 | Convolutional Block | (256, 512, 0.7) |
| 5 | 2D Convolution | (512, 1) |

Given below is a pictorial representation of the discriminator model,

1. Generator (702)—The generator (702) is also divided into various convolution blocks, however it has to parts: an encoder and a decoder. The encoder downsamples the image in every stage while decoder upsamples it. There are also skip connections between each corresponding stage. This is to ensure that not a lot of information is lost while decoding. The basic structure is the same for both parts except a transposed convolution is used in the case of the decoder with a simple ReLU activation. Following are the components in each block.

a. A single convolutional or transposed convolutional layer depending on whether input is encoded or decoded.
b. Batch Normalization
c. Activation function: Leaky ReLU for encoding and simple ReLU for decoding The Table (2) below provides additional information on the network architecture,

TABLE 2

Generator architecture

| Layer | Description | Hyper-parameters |
|---|---|---|
| 1 | 2D Convolution | (2, 64) |
| 2 | Encoder Block | (64, 128, (128, 128), 0.7) |
| 3 | Encoder Block | (128, 256, (64, 64), 0.7) |
| 4 | Encoder Block | (256, 512, (32, 32), 0.7) |
| 5 | Encoder Block | (256, 512, (16, 16), 0.7) |
| 6 | Encoder Block | (512, 512, (8, 8), 0.7) |
| 7 | Encoder Block | (512, 512, (4, 4), 0.7) |
| 8 | Encoder Block | (512, 512, (2, 2), 0.7) |
| 9 | Encoder Block | (512, 512, (1, 1), 0.7) |
| 10 | Decoder Block | (512, 512, (2, 2)) |
| 11 | Decoder Block | (512, 512, (4, 4)) |
| 12 | Decoder Block | (512, 512, (8, 8)) |
| 13 | Decoder Block | (512, 512, (16, 16)) |
| 14 | Decoder Block | (512, 256, (32, 32)) |
| 15 | Decoder Block | (256, 128, (64, 64)) |
| 16 | Decoder Block | (128, 64, (128, 128)) |
| 17 | Decoder Block | (64, 1, (256, 256)) |

Training was done using Google Collaboratory which uses an Nvidia Tesla K80 GPU having 2496 CUDA cores. The model was trained for 10 epochs for a batch size of 15. Training for higher number of epochs was computationally expensive. Moreover, performance saturated after 10 epochs. A higher value of the batch size proved detrimental to the model performance and was not changed for faster training.

Since the model includes a generator (702) and a discriminator (704), the training occurs in two phases. Let $\Theta_d$ represent the parameter space of the discriminator (704) and $\Theta_g$ that of the generator (702). The loss function for the generator (702) is given by, $$L(\Theta_D) = \max\{(\log(D(x)) + 1 - \log(G(z))\} \quad (4)$$

In the above equation, D is the discriminator (704) and G is the generator (702). x is the data set with known distribution while z is an unknown distribution. Since the objective of the discriminator D (704) is to accurately discriminate between the real and unknown dataset, the loss is maximised.

The goal of the generator G (702) on the other hand is to produce fake data points which closely mimic the real distribution. Thus it would attempt to reduce the same loss function.

$$L(\Theta_G) = \max\{(\log(D(x)) + 1 - \log(G(z))\} \quad (5)$$

The complete loss function would involve compounding both the loss functions. Furthermore, for the entire dataset, the expectation of the distributions shall be reduced.

$$L(\Theta_G; \Theta_D) = \min_{\Theta_G} \max_{\Theta_D} \{E(\log D(x)); P(x)) + E\{1 - \log(G(z)); P(z))\} \quad (6)$$

Regularization is an important process while training neural networks in order to avoid over-fitting. While training the generator (702), the method have applied a novel regularizing technique called main fold mix-up. In main fold mix-up, two different input images are randomly sampled and propagated forward to a particular hidden layer. After collecting the hidden representations, a new hidden vector generated by a linear combination of the two input vectors is propagated forward for the rest of the layers. The loss for this new hidden representation is calculated by comparing the output with the mixed target vector. This is explained by the following equations, $$X^{mixed} = \lambda X_i + (1 - \lambda) X_j \quad (7)$$

$$Y^{mixed} = \lambda Y_i + (1 - \lambda) Y_j \quad (8)$$

In the above equation $X_i$, $X_j$ are the hidden representations of input images while $Y_i$, $Y_j$ are the target vectors. $X^{mixed}$, $Y^{mixed}$ are the new vectors and $\lambda$ is a hyper parameter that is randomly sampled from a $\beta$ distribution. This is done so as to learn better hidden representations of the input data such that any downstream task becomes easier. Mix up strategies has previously been attempted for classification tasks but is rare for segmentation tasks. The method have tried two different kinds of methods, 1. Bottleneck mix-up: The method put a bottleneck layer in the "middle" of the disclosed network e.g., the layer prior to the decoder network. The equations (4) and (5) are applied to this layer.
2. Skip connection mix-up: The method will apply skip connections between symmetrically situated layers. The motivation for this is to reduce the amount of information lost while down sampling which occurs in the encoding process.

According to the requirement, the disclosed method can select different neural network solution. These can be broadly classified in 3 categories:

1. The CNNs are suited for image datasets. As radio map generations involves applying deep learning to image dataset, CNNs give the most optimized results.
2. The DNNs are neural networks having fully connected layers. If the size of images is small, then DNNs can be used effectively to generate radio map. DNNs include simple matrix multiplication in each layer and has less overhead.
3. The RNNs are best suited for time series data prediction. If the requirement is for generating frequent radio maps, then RNNs can be used in tandem with CNNs. RNN is able to remember the past stream of data and use it to make prediction in future.

Figure 9:
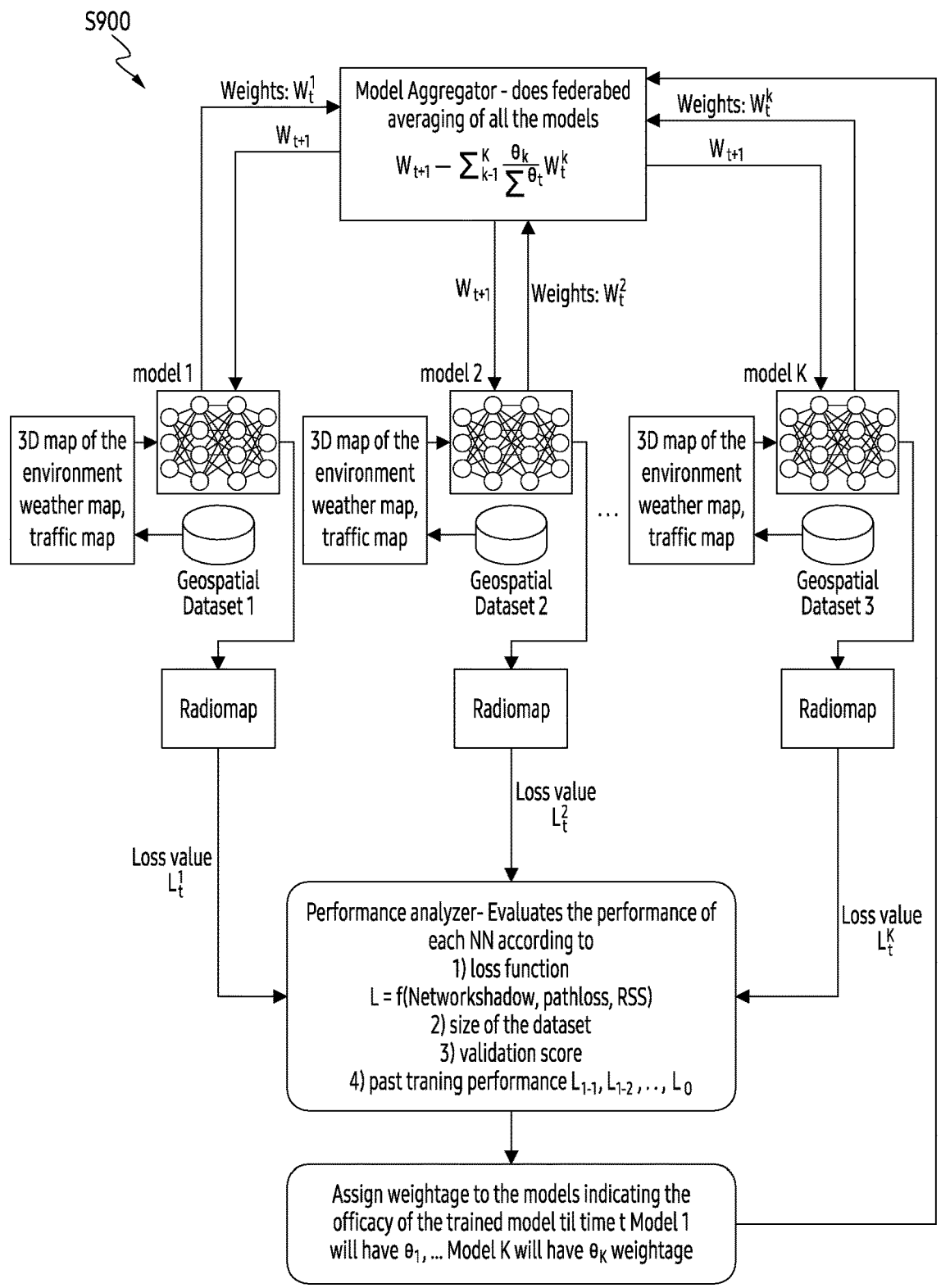
FIG. 9 is a diagram illustrating an example scenario of a radio map estimation using a federated learning model, according to various embodiments.

FIG. 9 is a diagram illustrating an example scenario (S900) of a radio map estimation using federated learning, according to various embodiments. Referring to FIG. 9, federated learning enables edge clouds to collaboratively learn a shared prediction model while keeping all the training data on edge cloud, decoupling the ability to do machine learning from the need to store the data in the central cloud. This goes beyond the use of local models that make predictions on mobile devices by bringing model training to the device as well.

The edge cloud downloads the current model, improves it by learning from data on the edge, and then summarizes the changes as a small focused update. Only this update to the model is sent to the central cloud, using encrypted communication, where it is immediately averaged with other user updates to improve the shared model. All the training data remains on the edge cloud, and no individual updates are stored in the central cloud. The following are steps for federated learning:

1. Step 1: The local models at the base stations are updated using the local data of the UEs connected to the local base station.
2. Step 2: The local base station then sends the local updates to the central server. The updates include the trained weights of the model.
3. Step 3: The server gathers the local updates and adds it to the global model. This is the weight aggregation procedure that averages the weights of the model. This way the system combines the learning of all the base stations and use each local base station to update a global model.
4. Step 4: The server sends the global model to all the base stations for next set of training.
5. Step 5: The Base station integrate the global model into their local model. Restart the training from step 1.

More robust training and a larger dataset is possible using federated learning. Each base station is able to provide real world mapping of the RF map. This can be used to create a common global model to be used by all base stations. Maintenance and operability is enhanced by the deployment of a single neural network model instead of each base station having a custom model.

Figure 10:
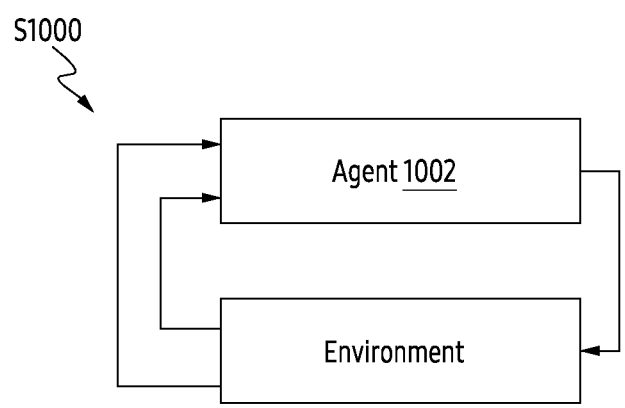
FIG. 10 and FIG. 11 are diagrams illustrating example scenarios of a radio map estimation using a Reinforcement Learning (RL) model, according to various embodiments.
Figure 11:
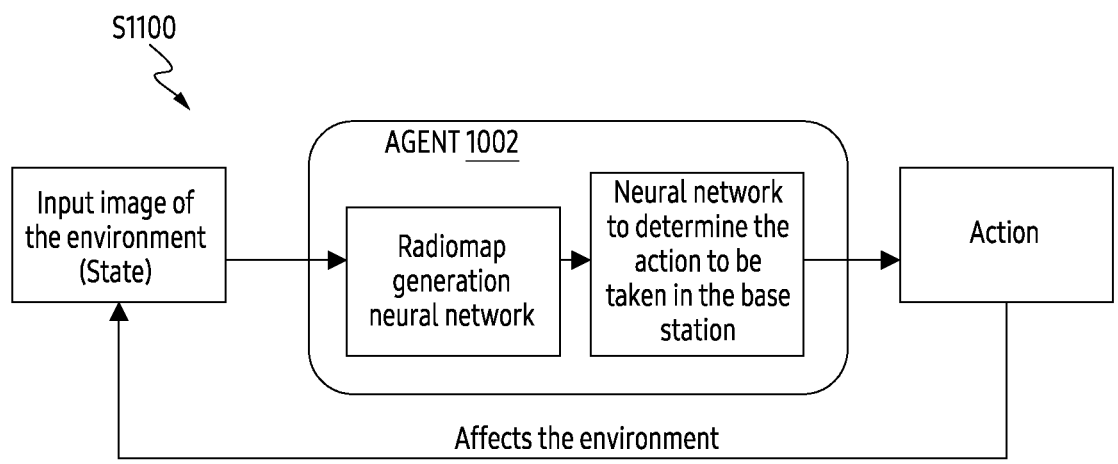

FIG. 10 and FIG. 11 are diagrams illustrating example scenarios (S1000 and S1100) of the radio map estimation using reinforcement learning (RL), according to various embodiments. Referring to FIGS. 10 and 11, the reinforcement learning (RL) solution can allow the zero touch network where depending upon the radio map, the tilt of the antenna, power of the RAN etc. can be changed to optimize the service quality. The RL agent (1002) uses online learning to train the agent (1002) to learn about the actions to be initiated based on the environment. This solution will enable real time radio map estimation as well as real time fix for problems identified using the generated radiomap.

The RL allows continuous planning and optimization on cloud. Since all of the aggregated data are stored in the cloud server, they can be reused anytime for site deployment and base station parameter optimization (e.g., antenna tilt and transmit power optimization). The solution can be deployed in the trained model module of the ORAN. The agent (1002) is deployed in RAN/CRAN/VRAN and may include deep RL using a neural network as in solution 1. The agent (1002) maps the state to actions based on the reward function. Radiomap generation is an associated task using which the agent (1002) decided on the action.

The Neural network to determine the action to be taken—it is a convolutional neural network (CNN) that identifies the network shadow regions in the generated radiomap. The CNN is uses different image filters to identify the intensity of signals in any given coordinates. The CNN model is trained separately (before starting the RL process). During training it is trained to identify the regions having low network coverage. The information about the network coverage is then passed to the RL agent (1002), which takes actions to rectify the issue.

Action taken can be classified in two categories:
1. Changing the power in the BSs—this involve increasing/decreasing the power in BSs in the environment. This change takes place in steps. So if the agent (1002) decides to increase the power in any BS then it can either increase or decrease it by θ.
2. Changing the antenna parameters—like tilt and height.

These changes are executed by the RL agent (1002) after every radiomap generation. There is no delay between the radiomap generation and RL action execution. The framework allows the RL agent (1002) adjust power and antenna parameters with respect to the weather, traffic and geospatial data.

As the weather and traffic changes frequently, the RL solution provides a low computational and high accuracy way for adjusting the radio frequency coverage area. This will reduce the network shadowing effect and increase the quality of service.

For increasing the efficiency of the RL agent (1002), the method wants it to take highly optimal actions which yield maximum positive reward. But in multiple BS situation the agent (1002) takes action which leads to toggling of power in a particular BS. This may refer, for example, to, in instance t the action reduces the power in BS by θ, but in the next instance t+1 it reduces the power in the same BS by θ.

The RL solution is able to predict the toggling using the past actions. Once the agent (1002) identifies that the power in a particular BS or a set of BSs are toggling then the agent (1002) changes the action. Instead of increasing or decreasing the power by θ, it starts changing the power in BSs in the order of −30, −20, 20, 30 . . . .

The changed order of increase and decrease of power allows the BS to adjust the power without toggling between power ranges. This will reduce the number of actions to be taken by the agent (1002).

Figure 12:
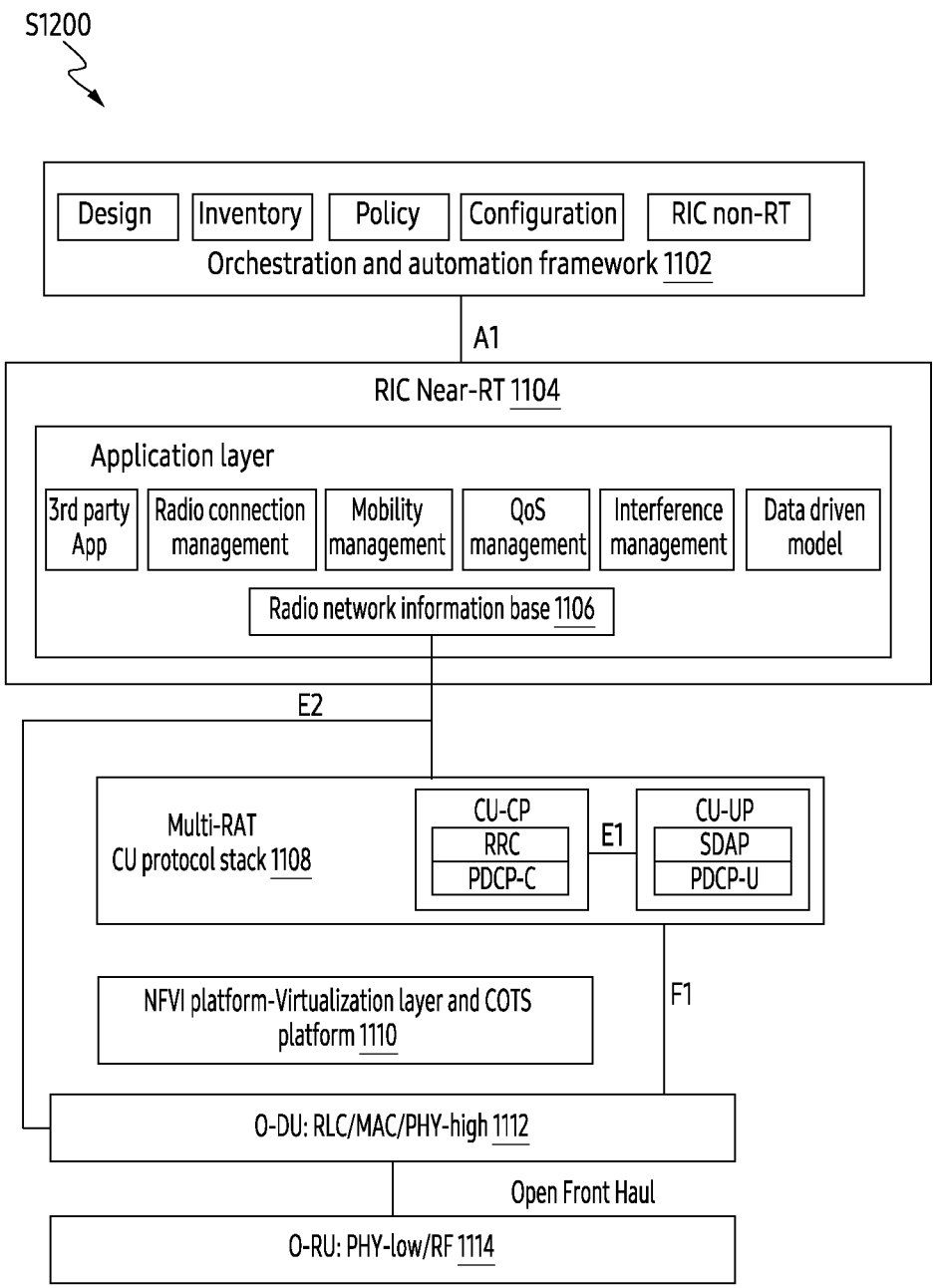
FIG. 12 is a diagram illustrating an overview of an O-RAN including the training model for radio map estimation, according to various embodiments.

FIG. 12 is a diagram illustrating an overview of the O-RAN (S1200) including the training model for radio map estimation, according to various embodiments. The O-RAN (1100) includes an orchestration and automation framework (1102), a RIC Near-RT (1104), a radio network information base (1106), a Multi-RAT CU protocol stack (1108), a NFVI platform-Virtualization layer and COTS platform (1110), an O-DU (1112) and an O-RU (1114). The RIC Near-RT (1104) handles the radio connection management, the mobility management, the QoS management, the interference management and the data driven model. The operations and functions of the training model (e.g., ML model, AI model, RL model, federated learning model or the like) is already explained in connection with FIG. 2 to FIG. 11.

The disclosed method is not limited to O-RAN. The disclosed method can be used for VRAN or CRAN or any cloud architecture. The disclosed method can be implemented in machine learning or Artificial intelligence modules or blocks or separate non-standard modules. The disclosed method can be implemented in BS or edge cloud or cloud RAN etc.

The various actions, acts, blocks, steps, or the like in the flow charts (S300 and S400) may be performed in the order presented, in a different order or simultaneously. Further, in various embodiments, some of the actions, acts, blocks, steps, or the like may be omitted, added, modified, skipped, or the like without departing from the scope of the disclosure.

In example embodiments, a method for generating a real-time radio coverage map in a wireless network. The method comprises receiving, by a network apparatus in the wireless network, real-time geospatial information from one or more geographical sources in the wireless network, determining, by the network apparatus, handover information of at least one user equipment (UE) in the wireless network from a plurality of base stations based on the real-time geospatial information, and generating, by the network apparatus, the real-time radio coverage map based on the handover information of the at least one UE and the real-time geospatial information.

In one example embodiment, wherein the geographical sources comprise at least one of: a satellite image system configured to capture a geographical image of at least one geographical area associated with the one or more geographical sources, drones configured to capture real time images of the at least one geographical area associated with the one or more geographical sources, a drive test system configured to determine drive test information in the at least one geographical area associated with the one or more geographical sources, a two dimensional (2D) and a three dimensional (3D) geospatial map system configured to generate a 2D and a 3D geospatial map of the at least one geographical area associated with the one or more geographical sources, a traffic monitoring system configured to monitor real-time traffic data of the at least one geographical area associated with the one or more geographical sources, or a weather monitoring system configured to determine weather information of the at least one geographical area associated with the one or more geographical sources.

In one example embodiment, the real-time geospatial information comprises at least one of satellite image of at least one geographical area associated with the one or more geographical sources, a 2D and a 3D geospatial map of the at least one geographical area associated with the one or more geographical sources, real-time traffic data of the at least one geographical area associated with the one or more geographical sources, weather information of the at least one geographical area associated with the one or more geographical sources, or drive test information identifying at least one of areas with no cellular connectivity, handover issues, call drops, low throughputs, or no data.

In one example embodiment, the generating, by the network apparatus, the real-time radio coverage map based on the handover information of the at least one UE and the real-time geospatial information comprises feeding, by the network apparatus, the real-time geospatial information and the handover information onto at least one machine learning (ML) model, marking, by the network apparatus, a location of the plurality of base stations in the wireless network from the real-time geospatial information using the at least one ML model, determining, by the network apparatus, material characteristic of objects in the location of the plurality of base stations in the wireless network based on the real-time geospatial information using the at least one ML model, wherein the material characteristic comprises a number of buildings, tree density, landscape data, and structure of objects, and generating, by the network apparatus, the real time radio coverage map using the at least one ML model based on the material characteristic of the objects, the real-time geospatial information, and the handover information of the at least one UE.

In one example embodiment, the method further comprises training, the network apparatus, the at least one ML model by receiving multiple inputs from the plurality of the geographical sources in the wireless network while rendering the radio maps in real time, creating a dataset by collecting the multiple inputs, collecting information associated with the base station, a corresponding radio-map in a situation, and an information for a geospatial data and weather and satellite date. The at least one at least one ML model is trained by feeding the multiple input. An output of the at least one ML model is a generated radiomap compared with a real radiomap collected from the base station and a difference between the generated radiomap and the real radiomap is used to update the at least one ML model.

In one example embodiment, the method further comprises receiving, by the network apparatus, a plurality of real-time radio coverage maps generated by other network apparatuses in the wireless network, wherein each real-time radio coverage map of the plurality of real-time radio coverage maps comprises local data of the UEs connected to a local network apparatus of the other network apparatuses, receiving, by the network apparatus, the trained weights of each real-time radio coverage map of the plurality of real-time radio coverage maps from each of the network apparatuses in the wireless network, aggregating, by the network apparatus, the trained weights of each real-time radio coverage map of the plurality of real-time radio coverage maps, generating, by the network apparatus, a global ML model based on the trained weights of each real-time radio coverage map of the plurality of real-time radio coverage maps; and sending, by the network apparatus, the global ML model to each of the network apparatuses in the wireless network for generating the real-time radio coverage map.

In one example embodiment, wherein the at least one ML model is hosted in at least one of a base station in the wireless network, virtualized radio access networks (vRANs) in the wireless network, open radio access network (O-RAN) in the wireless network, or a cloud radio access network (CRAN) in the wireless network.

In one example embodiment, the method further comprises determining, by the network apparatus, shadow regions in the real-time radio coverage map due to which coverage is limited in location of the base stations in the wireless network, determining, by the network apparatus, at least one remedial action to be performed to improvise the coverage in location of the base stations based on at least one of antenna tilt, modulation and coding scheme, or transmission mode, and automatically performing, by the network apparatus, the at least one remedial action in location of the base stations in the wireless network.

In one example embodiment, wherein the at least one remedial action comprises: changing antenna parameters of at least one radio resource for the at least one UE in the wireless network, and increasing or decreasing a power of at least one radio resource for the at least one UE in the wireless network, deploying the at least one radio resource for the at least one UE in the wireless network, and removing the at least one radio resource for the at least one UE in the wireless network. The antenna parameters comprises at least one of an orientation, a tilt angle or a height of the antenna. The at least one radio resource comprises a base station, a drone, a macro cell, and a small cell.

In one example embodiment, the shadow regions in the real-time radio coverage map is determined using a convolutional neural network (CNN).

In one example embodiment, the method further comprises training the CNN for determining the shadow regions by creating a dataset by collecting multiple inputs, and collecting information associated with the base station, a corresponding radio-map in a situation, and an information for a geospatial data and weather and satellite data, wherein the CNN is trained by feeding the input, wherein an output of the CNN is a radiomap which is compared with a real radiomap collected from the base station and a difference between the generated radiomap and the real radiomap is used to update at the CNN.

In one example embodiment, the network apparatus includes one of a base station, a centralized server handling different base stations in the wireless network, virtualized radio access networks (vRANs), open radio access network (O-RAN), a cloud radio access network (CRAN), a distributive server handling different base stations in the wireless network, and an edge server handling different base stations in the wireless network.

In example embodiments, a network apparatus configured to generate a real-time radio coverage map in a wireless network. The network apparatus comprises a memory comprising information of cells and user equipments (UEs) available in the wireless network, a processor connected to the memory, and a real-time radio coverage map controller, communicatively connected to the memory and the processor. The real-time radio coverage map controller is configured to receive real-time geospatial information from one or more geographical sources in the wireless network, determine handover information of at least one UE in the wireless network from a plurality of base stations based on the real-time geospatial information, and generate the real-time radio coverage map based on the handover information of the at least one UE and the real-time geospatial information.

In one example embodiment, the geographical sources comprise at least one of: a satellite image system configured to capture a geographical image of at least one geographical area associated with the one or more geographical sources, drones configured to capture real time images of the at least one geographical area associated with the one or more geographical sources, a drive test system configured to determine drive test information in the at least one geographical area associated with the one or more geographical sources, a 2D and 3D geospatial map system configured to generate a 2D and a 3D geospatial map of the at least one geographical area associated with the one or more geographical sources, a traffic monitoring system configured to monitor real-time traffic data of the at least one geographical area associated with the one or more geographical sources, or a weather monitoring system configured to determine weather information of the at least one geographical area associated with the one or more geographical sources.

In one example embodiment, the real-time geospatial information comprises at least one of: a satellite image of at least one geographical area associated with the one or more geographical sources, a 2D and a 3D geospatial map of the at least one geographical area associated with the one or more geographical sources, real-time traffic data of the at least one geographical area associated with the one or more geographical sources, weather information of the at least one geographical area associated with the one or more geographical sources, or drive test information identifying at least one of areas with no 4G connectivity, handover issues, call drops, low throughputs, or no data.

In one example embodiment, the generating the real-time radio coverage map based on the handover information of the at least one UE and the real-time geospatial information comprises feeding the real-time geospatial information and the handover information onto the at least one Machine Learning (ML) model, marking a location of the plurality of base stations in the wireless network from the real-time geospatial information using the at least one ML model, determining a material characteristic of objects in the location of the plurality of base stations in the wireless network based on the real-time geospatial information using the at least one ML model, wherein the material characteristic comprises a number of buildings, tree density, landscape data, and structure of objects, and generating the real time radio coverage map using the at least one ML model based on the material characteristic of the objects, the real-time geospatial information, and the handover information of the at least one UE.

In one example embodiment, wherein the real-time radio coverage map controller is configured to train the at least one ML model by receiving multiple inputs from the plurality of the geographical sources in the wireless network while rendering the radio maps in real time, creating a dataset by collecting the multiple inputs, and collecting information associated with the base station, a corresponding radio-map in a situation, and an information for a geospatial data and weather and satellite date. The at least one at least one ML model is trained by feeding the multiple input. An output of the at least one ML model includes a generated radiomap compared with the real radiomap collected from the base station and a difference between the generated radiomap and the real radiomap is used to update the at least one ML model.

In one example embodiment, the real-time radio coverage map controller is configured to receive a plurality of real-time radio coverage map generated by other network apparatuses in the wireless network, wherein each real-time radio coverage map of the plurality of real-time radio coverage maps comprises local data of the UEs connected to a local network apparatus of the other network apparatuses, receive the trained weights of each real-time radio coverage map of the plurality of real-time radio coverage maps from each of the network apparatuses in the wireless network, aggregate the trained weights of each real-time radio coverage map of the plurality of real-time radio coverage maps, generate a global ML model based on the trained weights of each real-time radio coverage map of the plurality of real-time radio coverage maps, and send the global ML model to each of the network apparatuses in the wireless network for generating the real-time radio coverage map.

In one example embodiment, the at least one ML model is hosted in at least one of a base station in the wireless network, virtualized radio access networks (vRANs) in the wireless network, open radio access network (O-RAN) in the wireless network, or a cloud radio access network (CRAN) in the wireless network.

In one example embodiment, the real-time radio coverage map controller is configured to determine shadow regions in the real-time radio coverage map due to which coverage is limited in location of the base stations in the wireless network, determine at least one remedial action to be performed to improvise the coverage in location of the base stations based on at least one of antenna tilt, modulation and coding scheme, or transmission mode, and automatically perform the at least one remedial action in location of the base stations in the wireless network.

In one example embodiment, the at least one remedial action comprises: changing antenna parameters of at least one radio resource for the at least one UE in the wireless network, and increasing or decreasing a power of at least one radio resource for the at least one UE in the wireless network, deploying the at least one radio resource for the at least one UE in the wireless network, and removing the at least one radio resource for the at least one UE in the wireless network. The antenna parameters comprise at least one of an orientation, a tilt angle and a height of the antenna, and the at least one radio resource comprises a base station, a drone, a macro cell, or a small cell.

In one example embodiment, the shadow regions in the real-time radio coverage map is determined using a convolutional neural network (CNN).

In one example embodiment, wherein the method comprises training the CNN for determining the shadow regions by
creating a dataset by collecting multiple inputs, and collecting information associated with the base station, a corresponding radio-map in a situation, and an information for a geospatial data and weather and satellite data, wherein the CNN is trained by feeding the input, wherein an output of the CNN is a generated radiomap compared with a real radiomap collected from the base station and a difference between the generated radiomap and the real radiomap is used to update at the CNN.

In one example embodiment, the network apparatus includes one of a base station, a centralized server handling different base stations in the wireless network, virtualized radio access networks (vRANs), open radio access network (O-RAN), a cloud radio access network (CRAN), a distributive server handling different base stations in the wireless network, and an edge server handling different base stations in the wireless network.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for generating a real-time radio coverage map in a wireless network, wherein the method comprises:
   receiving, by a network apparatus in the wireless network, real-time geospatial information from one or more geographical sources in the wireless network;
   determining, by the network apparatus, handover information of at least one user equipment (UE) in the wireless network from a plurality of base stations based on the real-time geospatial information; and
   generating, by the network apparatus, the real-time radio coverage map based on the handover information of the at least one UE and the real-time geospatial information.

2. The method as claimed in claim 1, wherein the geographical sources comprise at least one of: a satellite image system configured to capture a geographical image of at least one geographical area associated with the one or more geographical sources, drones configured to capture real time images of the at least one geographical area associated with the one or more geographical sources, a drive test system configured to determine drive test information in the at least one geographical area associated with the one or more geographical sources, a two dimensional (2D) and a three dimensional (3D) geospatial map system configured to generate a 2D and a 3D geospatial map of the at least one geographical area associated with the one or more geographical sources, a traffic monitoring system configured to monitor real-time traffic data of the at least one geographical area associated with the one or more geographical sources, or a weather monitoring system configured to determine weather information of the at least one geographical area associated with the one or more geographical sources.

3. The method as claimed in claim 1, wherein the real-time geospatial information comprises at least one of satellite image of at least one geographical area associated with the one or more geographical sources, a 2D and a 3D geospatial map of the at least one geographical area associated with the one or more geographical sources, real-time traffic data of the at least one geographical area associated with the one or more geographical sources, weather information of the at least one geographical area associated with the one or more geographical sources, or drive test information identifying at least one of areas with no cellular connectivity, handover issues, call drops, low throughputs, or no data.

4. The method as claimed in claim 1, wherein generating, by the network apparatus, the real-time radio coverage map based on the handover information of at least one UE and the real-time geospatial information comprising:
   feeding, by the network apparatus, the real-time geospatial information and the handover information onto at least one machine learning (ML) model;
   marking, by the network apparatus, a location of the plurality of base stations in the wireless network from the real-time geospatial information using the at least one ML model;
   determining, by the network apparatus, material characteristic of objects in the location of the plurality of base stations in the wireless network based on the real-time geospatial information using the at least one ML model, wherein the material characteristic comprises a number of buildings, tree density, landscape data, and structure of objects; and
   generating, by the network apparatus, the real time radio coverage map using the at least one ML model based on the material characteristic of the objects, the real-time geospatial information, and the handover information of at least one UE.

5. The method as claimed in claim 4, further comprising:
   training, the network apparatus, the at least one ML model by:
     receiving multiple inputs from the plurality of the geographical sources in the wireless network while rendering the radio maps in real time;
     creating a dataset by collecting the multiple inputs;
     collecting information associated with the base station, a corresponding radio-map in a situation, and an information for a geospatial data and weather and satellite date, wherein the at least one at least one ML model is trained by feeding the multiple input, wherein an output of the at least one ML model is a generated radiomap compared with a real radiomap collected from the base station and a difference between the generated radiomap and the real radiomap is used to update the at least one ML model.

6. The method as claimed in claim 5, the method further comprising:
   receiving, by the network apparatus, a plurality of real-time radio coverage maps generated by other network apparatuses in the wireless network, wherein each real-time radio coverage map of the plurality of real-time radio coverage maps comprises local data of the UEs connected to a local network apparatus of the other network apparatuses;
   receiving, by the network apparatus, the trained weights of each real-time radio coverage map of the plurality of real-time radio coverage maps from each of the network apparatuses in the wireless network;
   aggregating, by the network apparatus, the trained weights of each real-time radio coverage map of the plurality of real-time radio coverage maps;
   generating, by the network apparatus, a global ML model based on the trained weights of each real-time radio coverage map of the plurality of real-time radio coverage maps; and sending, by the network apparatus, the global ML model to each of the network apparatuses in the wireless network for generating the real-time radio coverage map.

7. The method as claimed in claim 5, wherein the at least one ML model is hosted in at least one of a base station in the wireless network, virtualized radio access networks (vRANs) in the wireless network, open radio access network (O-RAN) in the wireless network, or a cloud radio access network (CRAN) in the wireless network.

8. The method as claimed in claim 1, the method further comprising:
   determining, by the network apparatus, shadow regions in the real-time radio coverage map due to which coverage is limited in location of the base stations in the wireless network;
   determining, by the network apparatus, at least one remedial action to be performed to improvise the coverage in location of the base stations based on at least one of antenna tilt, modulation and coding scheme, or transmission mode; and
   automatically performing, by the network apparatus, the at least one remedial action in location of the base stations in the wireless network.

9. The method as claimed in claim 8, wherein the at least one remedial action comprises: changing antenna parameters of at least one radio resource for the at least one UE in the wireless network, and increasing or decreasing a power of at least one radio resource for the at least one UE in the wireless network, deploying the at least one radio resource for the at least one UE in the wireless network, and removing the at least one radio resource for the at least one UE in the wireless network,
   wherein the antenna parameters comprises at least one of an orientation, a tilt angle, or a height of the antenna, and
   wherein the at least one radio resource comprises a base station, a drone, a macro cell, and a small cell.

10. The method as claimed in claim 9, wherein the shadow regions in the real-time radio coverage map is determined using a convolutional neural network (CNN).

11. The method as claimed in claim 10, the method further comprising:
   training the CNN for determining the shadow regions by:
      creating a dataset by collecting multiple inputs; and
      collecting information associated with the base station, a corresponding radio-map in a situation, and an information for a geospatial data and weather and satellite data, wherein the CNN is trained by feeding the input, wherein an output of the CNN is a radiomap which is compared with a real radiomap collected from the base station and a difference between the generated radiomap and the real radiomap is used to update at the CNN.

12. The method as claimed in claim 1, wherein the network apparatus includes one of a base station, a centralized server handling different base stations in the wireless network, virtualized radio access networks (vRANs), open radio access network (O-RAN), a cloud radio access network (CRAN), a distributive server handling different base stations in the wireless network, or an edge server handling different base stations in the wireless network.

13. A network apparatus configured to generate a real-time radio coverage map in a wireless network, the network apparatus comprising:
   a memory comprising information of cells and user equipments (UEs) available in the wireless network;
   a processor connected to the memory; and
   a real-time radio coverage map controller, communicatively connected to the memory and the processor, configured to:
      receive real-time geospatial information from one or more geographical sources in the wireless network;
      determine handover information of at least one UE in the wireless network from a plurality of base stations based on the real-time geospatial information; and
      generate the real-time radio coverage map based on the handover information of at least one UE and the real-time geospatial information.

14. The network apparatus as claimed in claim 13, wherein the geographical sources comprise at least one of: a satellite image system configured to capture a geographical image of at least one geographical area associated with the one or more geographical sources, drones configured to capture real time images of the at least one geographical area associated with the one or more geographical sources, a drive test system configured to determine drive test information in the at least one geographical area associated with the one or more geographical sources, a 2D and 3D geospatial map system configured to generate a 2D and a 3D geospatial map of the at least one geographical area associated with the one or more geographical sources, a traffic monitoring system configured to monitor real-time traffic data of the at least one geographical area associated with the one or more geographical sources, or a weather monitoring system configured to determine weather information of the at least one geographical area associated with the one or more geographical sources.

15. The network apparatus as claimed in claim 13, wherein the real-time geospatial information comprises at least one of: a satellite image of at least one geographical area associated with the one or more geographical sources, a 2D and a 3D geospatial map of the at least one geographical area associated with the one or more geographical sources, real-time traffic data of the at least one geographical area associated with the one or more geographical sources, weather information of the at least one geographical area associated with the one or more geographical sources, or drive test information identifying at least one of areas with no 4G connectivity, handover issues, call drops, low throughputs, or no data.

16. The network apparatus as claimed in claim 13, wherein generating the real-time radio coverage map based on the handover information of at least one UE and the real-time geospatial information comprises:
   feeding the real-time geospatial information and the handover information onto the at least one Machine Learning (ML) model;
   marking a location of the plurality of base stations in the wireless network from the real-time geospatial information using the at least one ML model;
   determining a material characteristic of objects in the location of the plurality of base stations in the wireless network based on the real-time geospatial information using the at least one ML model, wherein the material characteristic comprises a number of buildings, tree density, landscape data, and structure of objects; and
   generating the real time radio coverage map using the at least one ML model based on the material characteristic of the objects, the real-time geospatial information, and the handover information of at least one UE.

17. The network apparatus as claimed in claim 13, wherein the real-time radio coverage map controller is configured to train the at least one ML model by:

receiving multiple inputs from the plurality of the geographical sources in the wireless network while rendering the radio maps in real time;

creating a dataset by collecting the multiple inputs; and collecting information associated with the base station, a corresponding radio-map in a situation, and an information for a geospatial data and weather and satellite date, wherein the at least one at least one ML model is trained by feeding the multiple input, wherein an output of the at least one ML model includes a generated radiomap compared with the real radiomap collected from the base station and a difference between the generated radiomap and the real radiomap is used to update the at least one ML model.

18. The network apparatus as claimed in claim 17, wherein the real-time radio coverage map controller is configured to:

receive a plurality of real-time radio coverage map generated by other network apparatuses in the wireless network, wherein each real-time radio coverage map of the plurality of real-time radio coverage maps comprises local data of the UEs connected to a local network apparatus of the other network apparatuses;

receive the trained weights of each real-time radio coverage map of the plurality of real-time radio coverage maps from each of the network apparatuses in the wireless network;

aggregate the trained weights of each real-time radio coverage map of the plurality of real-time radio coverage maps;

generate a global ML model based on the trained weights of each real-time radio coverage map of the plurality of real-time radio coverage maps; and send the global ML model to each of the network apparatuses in the wireless network for generating the real-time radio coverage map.

19. The network apparatus as claimed in claim 17, wherein the at least one ML model is hosted in at least one of a base station in the wireless network, virtualized radio access networks (vRANs) in the wireless network, open radio access network (O-RAN) in the wireless network, or a cloud radio access network (CRAN) in the wireless network.

20. The network apparatus as claimed in claim 13, wherein the real-time radio coverage map controller is configured to:

determine shadow regions in the real-time radio coverage map due to which coverage is limited in location of the base stations in the wireless network;

determine at least one remedial action to be performed to improvise the coverage in location of the base stations based on at least one of antenna tilt, modulation and coding scheme, or transmission mode and automatically perform the at least one remedial action in location of the base stations in the wireless network.

* * * * *